(12) United States Patent
Huang (10) Patent No.: US 7,198,281 B2
(45) Date of Patent: Apr. 3, 2007

(54) FOLDABLE BICYCLE

(75) Inventor: Shou-Qing Huang, Pingshan Town (TW)

(73) Assignee: Yebao Bicycle Parts & Components Industrial (Schenzhen) Co., Ltd, Guangdong (CN)

( * ) Notice: Subject to any disclaimer, the term of this patent is extended or adjusted under 35 U.S.C. 154(b) by 157 days.

(21) Appl. No.: 10/971,401

(22) Filed: Oct. 21, 2004

(65) Prior Publication Data

US 2006/0087095 A1    Apr. 27, 2006

(51) Int. Cl.
*B62K 15/00* (2006.01)

(52) U.S. Cl. ........................ 280/278; 280/287

(58) Field of Classification Search ............ 280/278, 280/287; 16/257, 258; 403/119, 322.4, 403/DIG. 8
See application file for complete search history.

(56) References Cited

U.S. PATENT DOCUMENTS

| | | | | |
|---|---|---|---|---|
| 4,252,335 A | * | 2/1981 | Brenner | 280/287 |
| 4,842,292 A | * | 6/1989 | Wang | 280/287 |
| 5,205,573 A | * | 4/1993 | Mhedhbi | 280/287 |
| 5,269,550 A | * | 12/1993 | Hon et al. | 280/278 |
| 5,387,955 A | * | 2/1995 | Cocca | 396/59 |
| 6,135,478 A | * | 10/2000 | Montague | 280/287 |
| 6,135,668 A | * | 10/2000 | Lin | 403/322.4 |
| 6,336,649 B1 | * | 1/2002 | Lin | 280/278 |

\* cited by examiner

*Primary Examiner*—Lesley D. Morris
*Assistant Examiner*—L. Lum
(74) *Attorney, Agent, or Firm*—Raymond Y. Chan; David and Raymond Patent Group (57) ABSTRACT

A foldable bicycle includes a bicycle frame, two driving wheels and a folding arrangement. The bicycle frame has a front portion, a rear portion, and a body frame including three supporting members to define a triangular structure. The folding arrangement includes a folding joint and a detachable connecting joint. The folding joint is provided at one of the supporting members to pivotally connect the front portion of the bicycle frame with the rear portion thereof. The detachable connecting joint is provided at another of the supporting member to disengage the triangular structure of the body frame, such that the front portion of the bicycle frame is adapted to pivotally fold towards the rear portion thereof via the folding joint to overlap the two driving wheels so as to fold up the foldable bicycle to a compact structure.

6 Claims, 9 Drawing Sheets

FOLDABLE BICYCLE

BACKGROUND OF THE PRESENT INVENTION

1. Field of Invention

The present invention relates to a bicycle, and more particularly to a foldable bicycle comprising a triangular body frame which is capable of being folded into a compact structure.

2. Description of Related Arts

Since the first bicycle was invented, it has been widely utilized as an economical and convenient mode of transportation. With the advance of technology, bicycles have become a kind of leisure and sports equipment. Many people would ride bicycle occasionally and store it in a safe place while they are not using the bicycle.

Therefore, the bulky size of a conventional bicycle has caused many problems for many people, especially those who live in a confined apartment or in a city where space has become extremely valuable. In such cases, people have to worry where to store their bulky bicycles while they are not in use. While some of them may secure a place in their garages or somewhere outside their home, yet many of them have to put their bicycles into their apartments and suffer from much inconvenience. In some circumstances, the bulky bicycle may become a potential source of danger for children.

In order to resolve this problem, some sort of foldable bicycles have been developed in which the bicycle frame is adapted to be folded to form a compact structure so as to minimize the spatial requirement needed for storing the foldable bicycle. On the face, this idea sounds promising in that the foldable bicycles take much less space and people may store them conveniently without causing much difficulty.

There are, however, discrepancies among these foldable bicycles. A conventional foldable bicycle usually comprises a bicycle frame supporting two bicycle wheels and a user, wherein the bicycle frame comprises a front frame rotatably supporting the front wheel, a rear frame rotatably supporting the rear wheel, and a body supporting frame connecting between the front frame and the rear frame for supporting the user. The driving arrangement of the foldable bicycle is usually mounted on the body supporting frame for driving the foldable bicycle. Very often, the body supporting frame comprises one single longitudinal member connecting the front frame and the rear frame so that by mounting a folding joint at the longitudinal member, this longitudinal member is selectively detached into two portions for folding and unfolding with respect to a pivot.

It follows that since the body supporting frame is limited to comprising one single longitudinal member, the amount of which it can carry load is inevitably limited. Therefore, conventional foldable bicycles tend to be small in size, and only fit for a limited number of people, and for a limited number of circumstances.

As a matter of fact, there exist some other bicycles in which their body supporting frame comprises three supporting members each of which is integrally connected in an end to end manner with the adjacent one so as to form a triangular structure. In such a case, it is difficult to fold the triangular structure so as to fold the entire bicycle into a compact structure. It may be possible to mount a folding joint on each of the supporting members for folding and unfolding, but this poses a great risk of structure instability, especially when the bicycle is in the course of vigorous operation, such as in the course of climbing uphill.

SUMMARY OF THE PRESENT INVENTION

A main object of the present invention is to provide a foldable bicycle comprising a triangular body frame which is capable of being folded into a compact structure, and unfolded to operate in a stable and secure manner.

Another object of the present invention is to provide a foldable bicycle comprising a folding arrangement which is adapted to break the triangular structure of the body frame and allow folding and unfolding of the bicycle at the body frame. In order words, the present invention substantially resolves the conventional difficulty of folding a triangular body frame of a bicycle.

Another object of the present invention is to provide a foldable bicycle which does not involve complicated mechanical components for achieving the folding of the bicycle so as to minimize the manufacturing cost and the ultimate selling price of the present invention.

Another object of the present invention is to provide a foldable bicycle which is easy to use, secure and safe.

Accordingly, in order to accomplish the above objects, the present invention provides a foldable bicycle, comprising:

a bicycle frame, having a front portion, a rear portion, and a body frame connecting the front portion with the rear portion, wherein the body frame having a triangular structure comprises three supporting members connecting with each other;

two driving wheels rotatably mounted to the front and rear portions of the bicycle frame; and a folding arrangement, which comprises:

a folding joint provided at one of the supporting members to pivotally connect the front portion of the bicycle frame with the rear portion thereof; and a detachable connecting joint provided at another the supporting member to form the respective supporting member into two detachable engaging portions so as to disengage the triangular structure of the body frame, such that when the two detachable engaging portions are detached from each other, the front portion of the bicycle frame is adapted to pivotally fold towards the rear portion thereof via the folding joint to overlap the two driving wheels so as to fold up the foldable bicycle with a compact structure.

These and other objectives, features, and advantages of the present invention will become apparent from the following detailed description, the accompanying drawings, and the appended claims.

DETAILED DESCRIPTION OF THE PREFERRED EMBODIMENT

Figure 1:
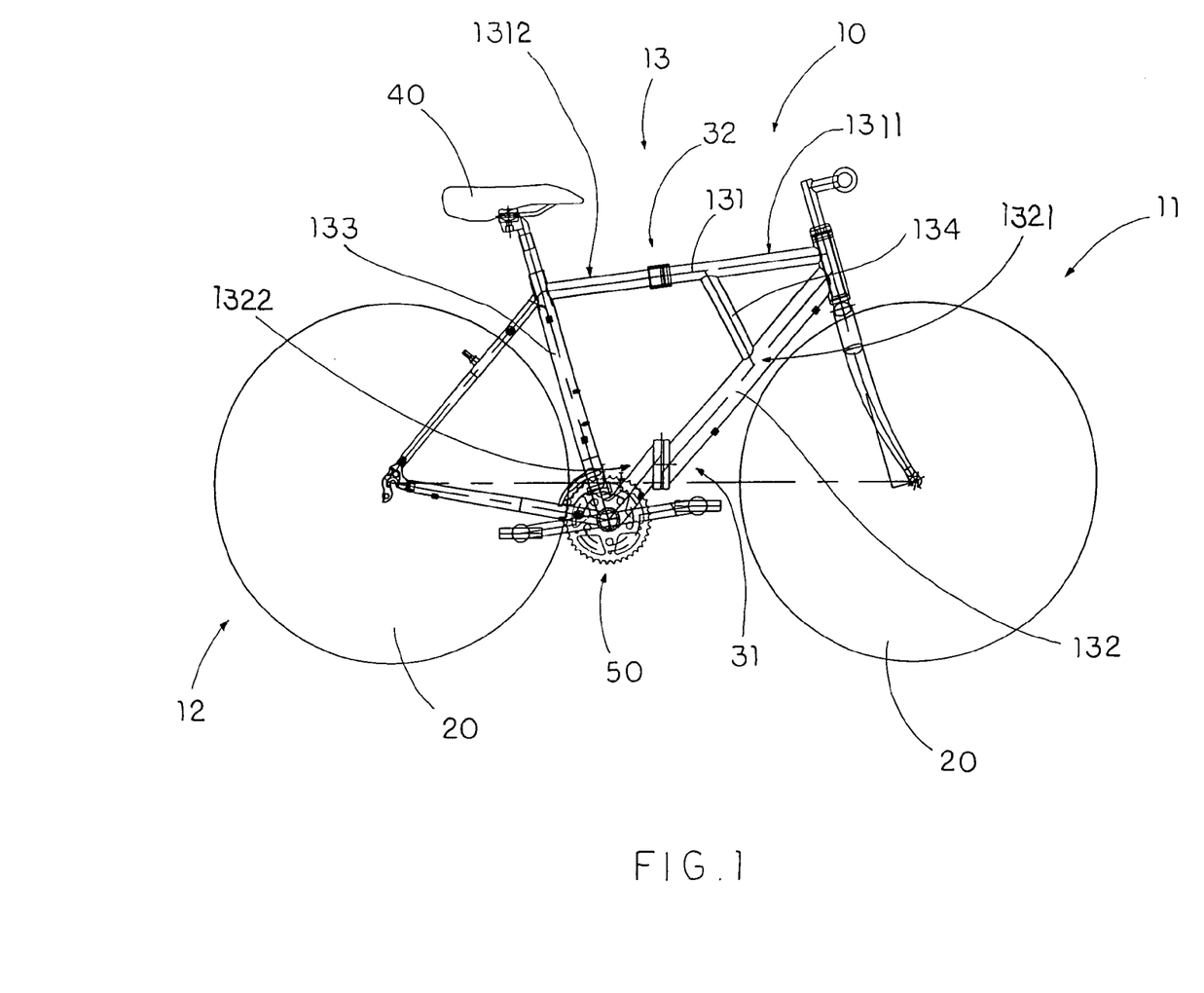
FIG. 1 is a side view of a foldable bicycle according to a first preferred embodiment of the present invention.
Figure 2:
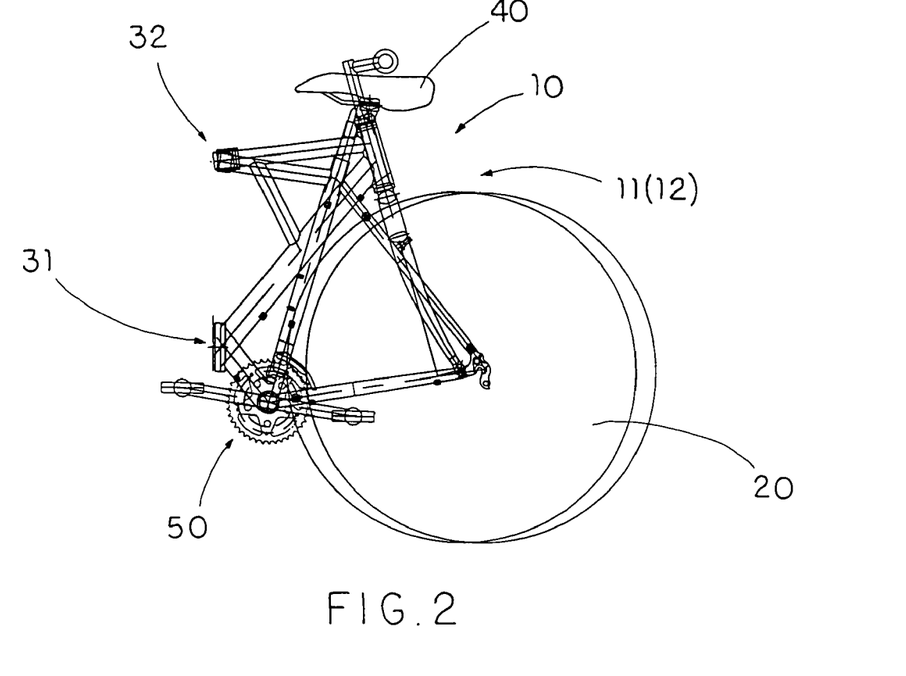
FIG. 2 is a side view of a foldable bicycle according to a first preferred embodiment of the present invention, illustrating that the foldable bicycle is being folded.

Referring to FIG. 1 and FIG. 2 of the drawings, a foldable bicycle according to a first preferred embodiment of the present invention is illustrated, in which the foldable bicycle comprises a bicycle frame 10, two driving wheels 20, a folding arrangement, and a driving arrangement 50 mounted on the bicycle frame 10 for driving the two driving wheels 20 to move.

The bicycle frame 10 has a front portion 11, a rear portion 12, and a body frame 13 connecting the front portion 11 with the rear portion 12, wherein the body frame 13 has a triangular structure comprises three supporting members 131, 132, 133 integrally connecting with each other to support a user riding thereon. Moreover, the two driving wheels 20 are rotatably mounted to the front 11 and rear portions 12 of the bicycle frame 10 for rotatably supporting the bicycle frame 10 moving in a predetermined direction.

The folding arrangement comprises a folding joint 31 and a detachable connecting joint 32, wherein the folding joint 31 is provided at one of the supporting members 131 to pivotally connect the front portion 11 of the bicycle frame 10 with the rear portion 12 thereof.

On the other hand, the detachable connecting joint 32 is provided at another of the supporting member 131 to split the respective supporting member 131 into two detachable engaging portions 1311, 1312 so as to disengage the triangular structure of the body frame 13, such that when the two detachable engaging portions 1311, 1312 are detached from each other, the front portion 11 of the bicycle frame 10 is adapted to pivotally fold towards the rear portion 12 thereof via the folding joint 31 to overlap the two driving wheels 20 so as to fold up the foldable bicycle in a compact structure, as shown in FIG. 1B of the drawings.

Referring to FIG. 1 of the drawings, the first of the supporting members 131 is longitudinally extended between the front portion 11 and the rear portion 12, the second of the supporting members 132 is inclinedly and rearwardly extended from the first supporting member 131 at the front portion 11, and the third of the supporting members 133 is transversely extended to connect the first and the second supporting members 131, 132 at the rear portion 12 to define the triangular structure of the body frame 10, wherein a upper top portion of the third supporting member 133 is transversely and upwardly extended to support a body seat 40 thereon.

In order to reinforce an overall strength of the bicycle frame 10, the body frame 13 further comprises a reinforcing member 134 extended within the triangular structure to reinforce the body frame 10 so that it can withstand greater loading and vibrations while the folding bicycle is in operation.

According to the first preferred embodiment, the second supporting member 132 comprises a first portion 1321 and a second portion 1322 wherein the folding joint 31 connects the first portion 1321 and the second portion 1322 in a detachable manner so as to detach the second supporting member 132 for folding the front portion 11 towards the rear portion 12.

Figure 3:
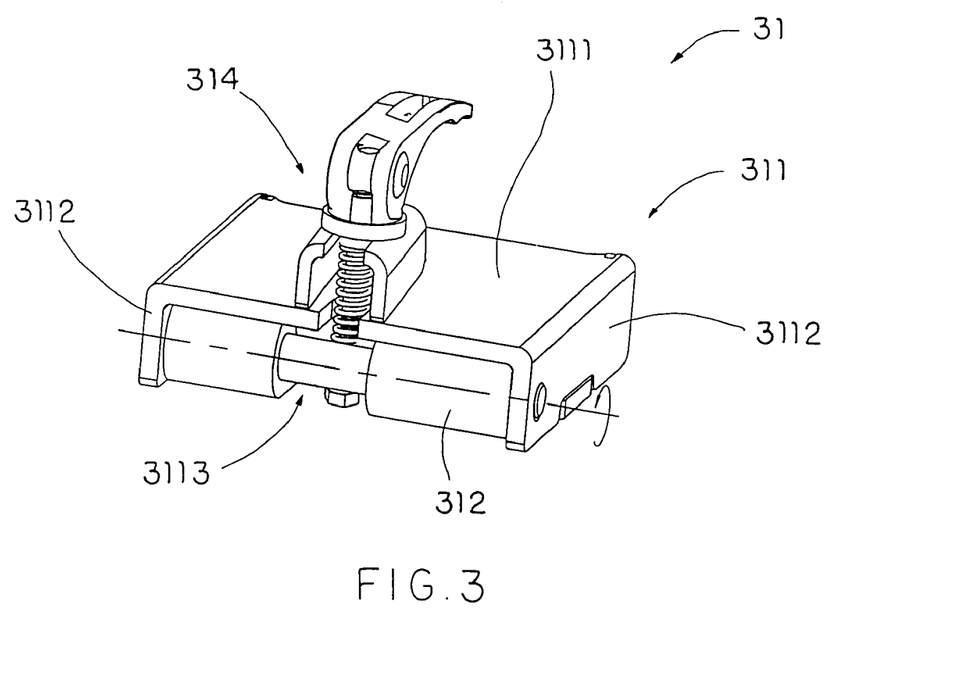
FIG. 3 is a perspective view of a folding joint according to the above first preferred embodiment of the present invention.
Figure 4:
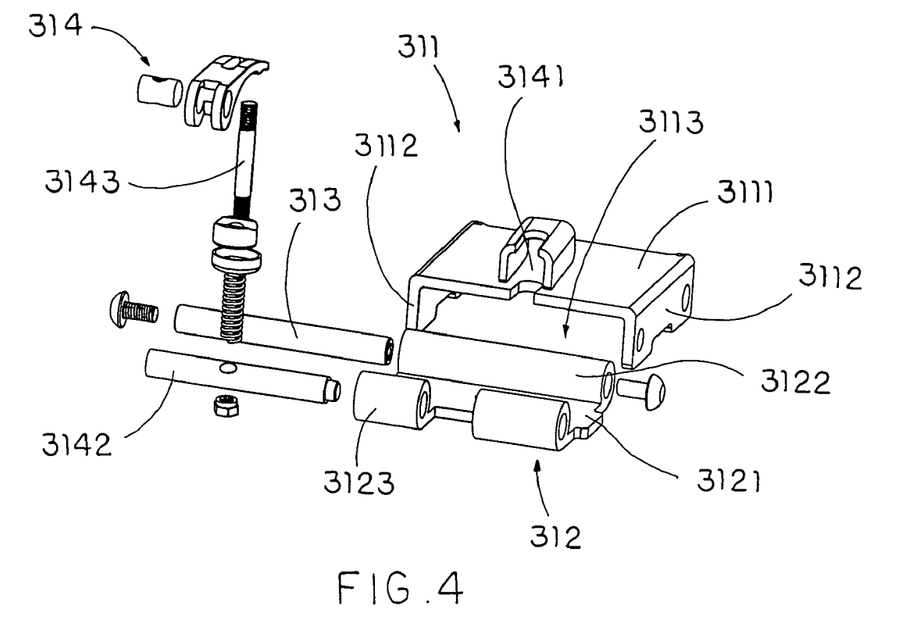
FIG. 4 is an exploded perspective view of the folding joint according to the above first preferred embodiment of the present invention.

Specifically, referring to FIG. 3 and FIG. 4 of the drawings, the folding joint 31 comprises a pivot pin 313, a joint body 311 having a pivotal cavity 3113 defined by a top cover 3111 and two side mounting walls 3112 of the joint body 311, and a fold guider 312 pivotally mounted on the two side mounting walls 3112 within the pivotal cavity 3113 via the pivot pin 313, such that the fold guider 312 is capable of pivotally folding to flip out of the pivotal cavity 3113, wherein a corresponding end of the first portion 1321 and the second portion 1322 of the second supporting member 132 are connected with the fold guider 312 and the joint body 311 respectively so that the first portion 1321 and the second portion 1322 of the second supporting member 132 are capable of folding towards each other for folding the front portion 11 towards rear portion 12 of the bicycle frame 10 to form the compact structure.

Moreover, the folding joint 31 further comprises a folding lock 314 provided on the joint body 311 and adapted to block the pivotal movement of the fold guider 312 with respect to the joint body 311 so as to lock up a folding motion of the bicycle frame 10.

Referring to FIG. 4 of the drawings, the fold guider 312 has a connecting base 3121, a tubular axial holder 3122, having a through axial slot, formed on a first side edge portion of the connecting base 3121, and a lock holder 3123 formed on a second side edge portion of the connecting base 3121, wherein the pivot pin 313 is sildably inserted into the axial slot of the tubular axial holder 3122 for pivotally connecting the fold guider 312 with the joint body 311 at the two side mounting walls 3112 thereof.

The folding lock 314 comprises a lock platform 3141 formed on the top cover 3111 of the joint body 311, a longitudinal lock member 3142 connecting with the lock holder 3123, and a transverse lock member 3143 mounted on the lock platform 3141 and adapted to move between a locked position and an unlocked position, wherein at the locked position, the transverse lock member 3143 is extended to couple with the longitudinal lock member 3142 and interlock with the lock platform 3141 for blocking a pivotal movement of the fold guider 312, wherein at the unlock position, the transverse lock member 3143 is lifted to disengage with the longitudinal lock member 3142 so as to allow pivotal movement of the fold guider 312 for allowing folding of the bicycle frame 10.

Figure 5:
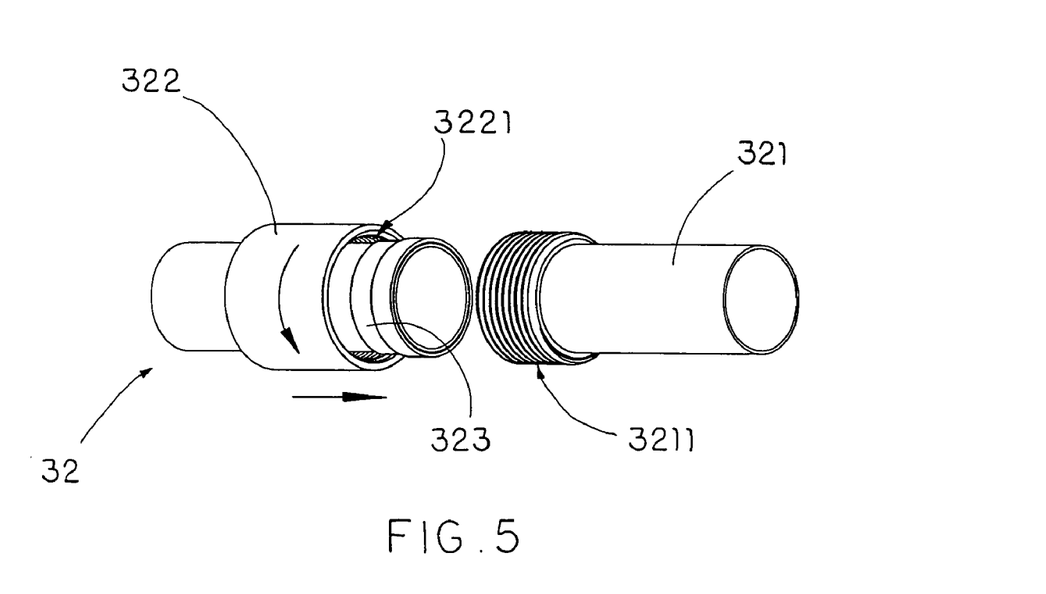
FIG. 5 is an exploded perspective view of a detachable connecting joint according to the above first preferred embodiment of the present invention.
Figure 6:
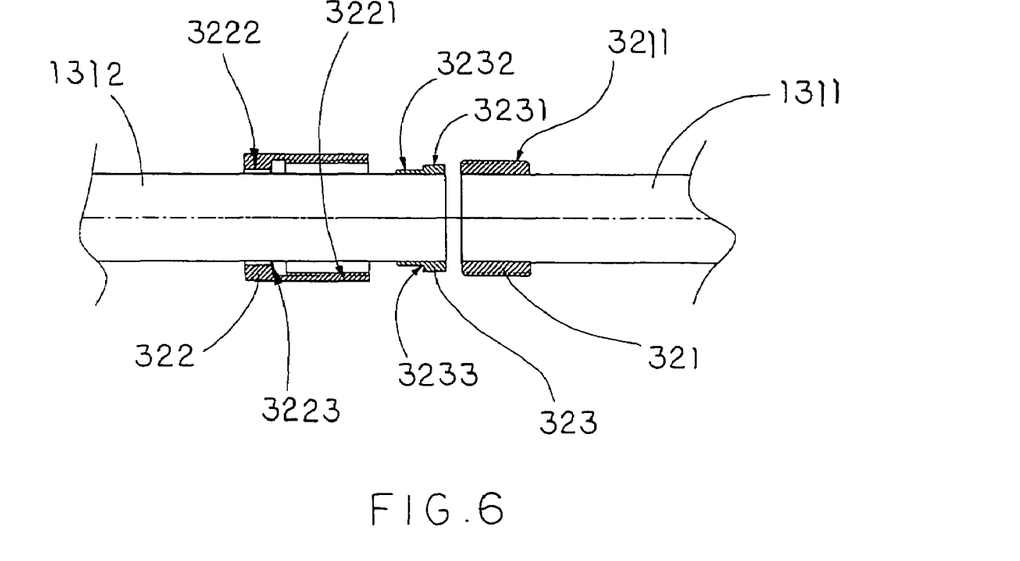
FIG. 6 is a sectional side view of the detachable connecting joint according to the above first preferred embodiment of the present invention, illustrating that the two engaging portions of the relevant supporting member are detached for folding.
Figure 7:
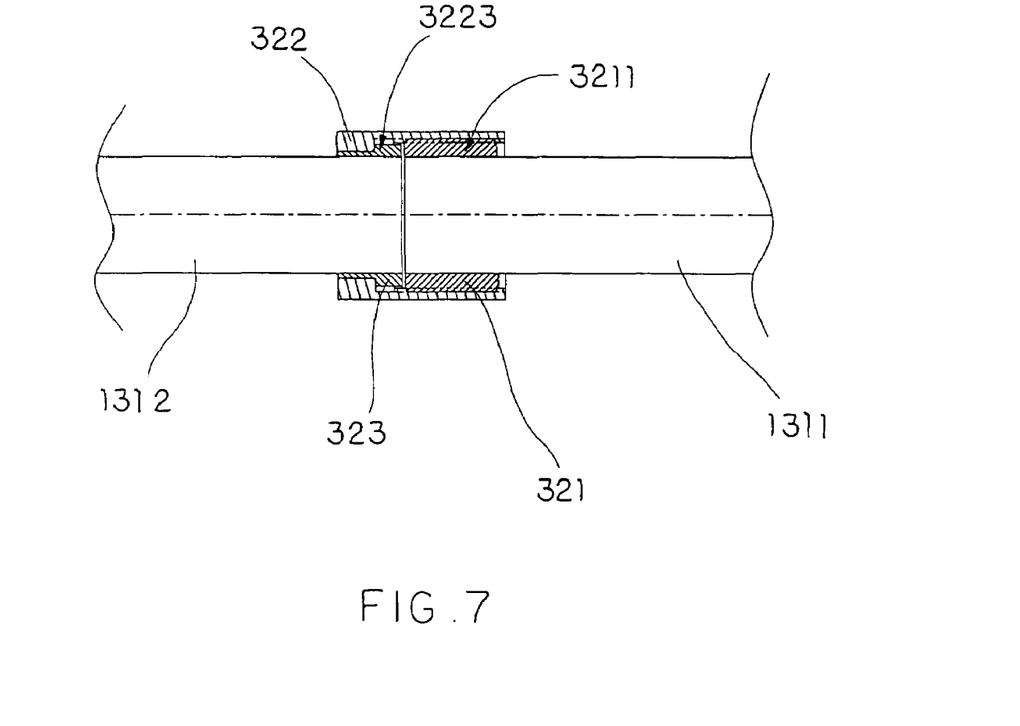
FIG. 7 is a sectional side view of the detachable connecting joint according to the above first preferred embodiment of the present invention, illustrating that the two engaging portions of the relevant supporting member are engaged.

Referring to FIG. 5 to FIG. 7 of the drawings, the detachable connecting joint 32 comprises a first and a second tubular detachable connector 321, 322 each having a tubular hole defined by a sidewall of the respective detachable connector 321, 322, wherein the two engaging portions 1311, 1312 of the first supporting member 131 are connected with the first and the second tubular detachable connector 321, 322 respectively within the respective tubular hole.

The first detachable connector 321 has a thread portion 3211 formed on an outer rim thereof while the second detachable connector 322 has a corresponding enlarged bored portion 3221 formed on an inner sidewall of the respective tubular hole of the second detachable connector 322 for fittedly engaging with the thread portion 3211 of the first detachable connector 321. Referring to FIG. 6 of the drawings, a cross sectional outer diameter of the thread portion 3211 of the first detachable connector 321 is corresponding with an inner diameter of the enlarged bored portion 3221 of the second detachable connector 322, so that the thread portion 3211 is adapted to screw up and engage with the enlarged bored portion 3211 for detachably connecting the first and the second connector 321, 322.

In other words, it is important to note that the second detachable connector 322 therefore has two different portions have different cross sectional diameters, namely the enlarged bored portion 3221 having the diameter corresponding with that of the thread portion 3211 of the first detachable connector 321, and a main portion 3222 having an inner diameter smaller than that of the enlarged bored portion 3221 while slightly larger than a diameter of the respective detachable engaging portion 1312 of the first supporting member 131 of the body frame 13. Furthermore, the enlarged bored portion 3221 and the main portion 3222, having differing diameters, define a blocking platform 3223 transversely extended as the boundary between the enlarged bored portion 3221 and the main portion 3222.

Moreover, the detachable connecting joint 32 further comprises a securing member 323 detachably connecting between the first and the second detachable connectors 321, 322 for being fittedly sandwiched between the first and the second connector 321, 322 so as to prevent unwanted lateral movement between the first and the second connector 321, 322 when the thread portion 3211 of the first detachable connector 321 is screwed up an engaged with the bored portion 3221 of the second detachable connector 322.

Specifically, the securing member 323 is also tubular in shape, and has an enlarged securing portion 3231 having a diameter corresponding with the enlarged bored portion of the 3221 of the second detachable connector 322, and a restricted retention portion 3232 having a diameter corresponding with a diameter of the main portion 3223 of the second detachable connector 322 to define a biasing shoulder 3233 between the enlarged securing portion 3231 and the restricted retention portion 3232.

When the first detachable connector 321 is screwed to engage with the second detachable connector 322, the securing member 323 is pushed to sandwich between the first and the second detachable connector 321, 322 in such a manner that the restricted retention portion 3232 is fittedly and slidably engaged with the main portion 3223 of the second detachable connector 322, while the enlarged securing portion 3231 is pushed to fittedly engage with the enlarged bored portion 3221 of the second detachable connector 322 such that the biasing shoulder 3233 biases against the blocking platform 3223 for restricting lateral movement between the first detachable connector 321, the second detachable connector 322, and the securing member 323.

As such, the two engaging portions 1311, 1312 of the first supporting member 131 are detachably connected with each other through the detachable connecting joint 32. Referring to FIG. 1B of the drawings, when the two engaging portions 1311, 1312 are detached and that the folding lock 314 of the folding joint 31 is relieved, the front portion 11 and the rear portion 12 of the bicycle frame 10 is adapted to fold towards each other about the folding joint 31 so as to become a compact structure.

Figure 8:
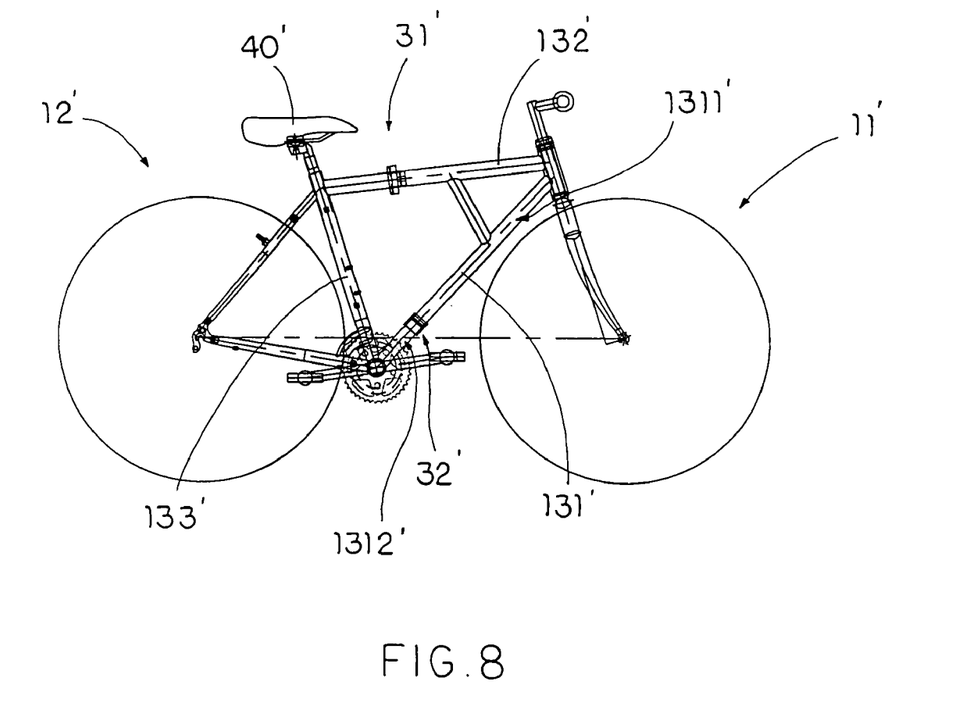
FIG. 8 is a first alternative mode of the foldable bicycle according to the above first preferred embodiment of the present invention, illustrating that the foldable bicycle is unfolded.
Figure 9:
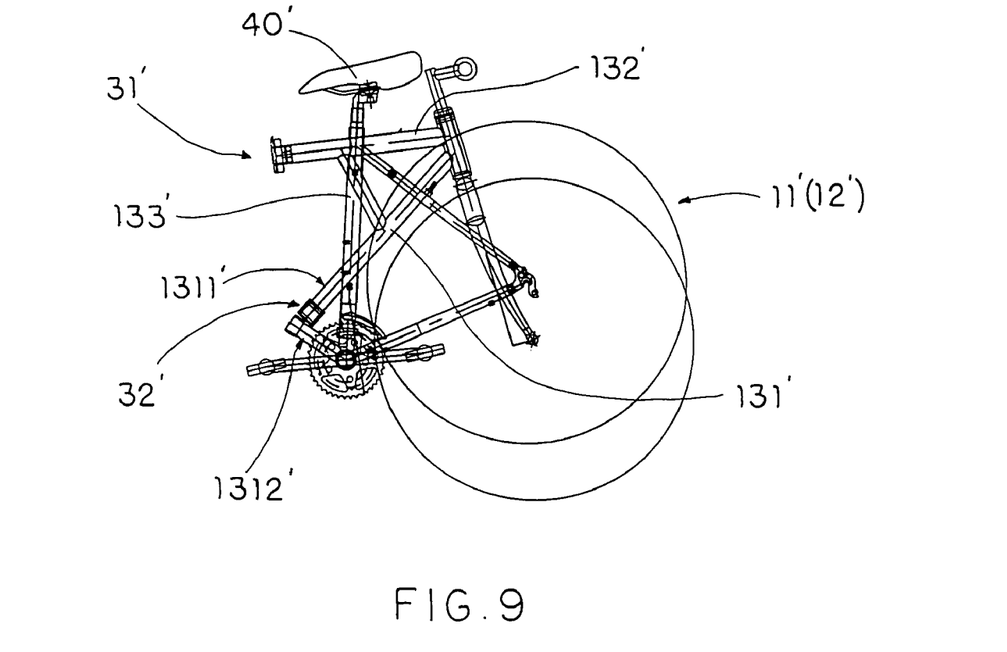
FIG. 9 is a first alternative mode of the foldable bicycle according to the above first preferred embodiment of the present invention, illustrating that the foldable bicycle is being folded.

Referring to FIG. 8 to FIG. 9 of the drawings, a first alternative mode of the foldable bicycle according to the above first preferred embodiment of the present invention is illustrated. The first alternative mode is similar to the first preferred embodiment except the position of the folding joint 31' and the detachable connecting joint 32'.

According to the first alternative mode, the second of the supporting members 132' is longitudinally extended between the front portion 11' and the rear portion 12', the first of the supporting members 131' is inclinedly and rearwardly extended from the second supporting member 131' at the front portion 11', while the third of the supporting members 133' is transversely extended to connect the first and the second supporting members 131', 132' at the rear portion 12' to define the triangular structure of the body frame 10', wherein a upper top portion of the third supporting member 133' is transversely and upwardly extended to support a body seat 40' thereon.

In other words, when the folding joint 31' is unlocked and the detachable connecting joint 32' is detached to detach the first supporting member 131' into the two engaging portions 1311', 1312', the front portion 11' and the rear portion 12' of the bicycle frame 10' is adapted to fold towards each other to form a compact structure, as shown in FIG. 8 of the drawings.

Figure 10:
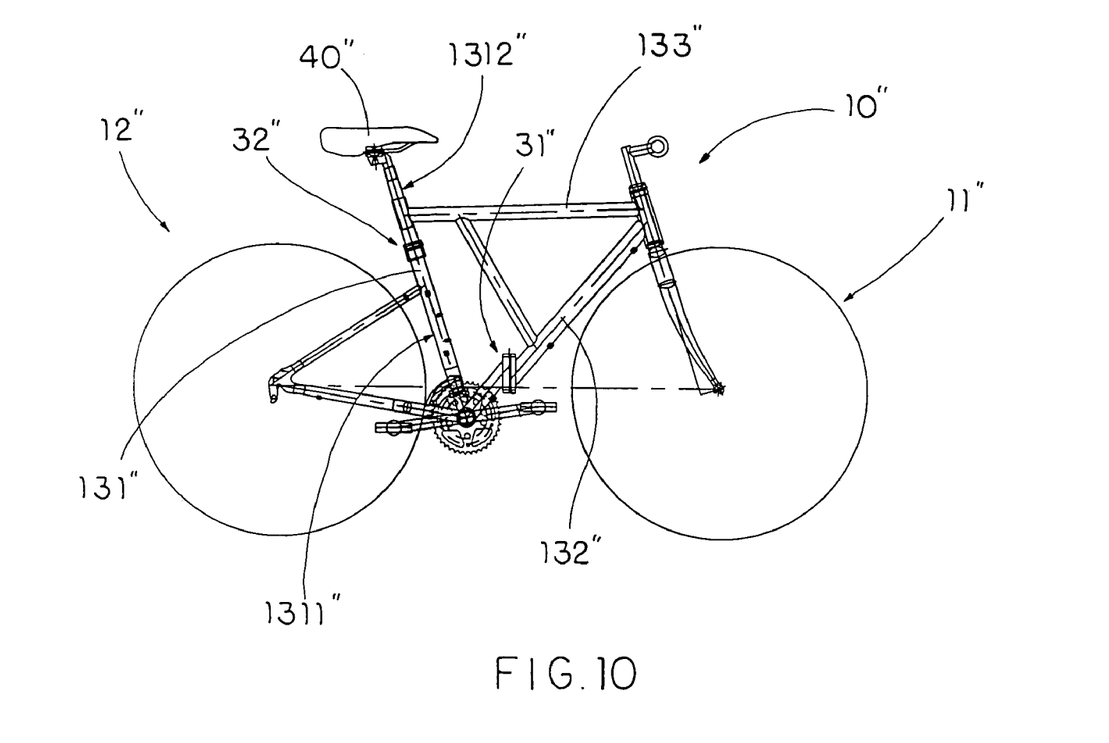
FIG. 10 is a second alternative mode of the foldable bicycle according to the above first preferred embodiment of the present invention, illustrating that the foldable bicycle is unfolded.
Figure 11:
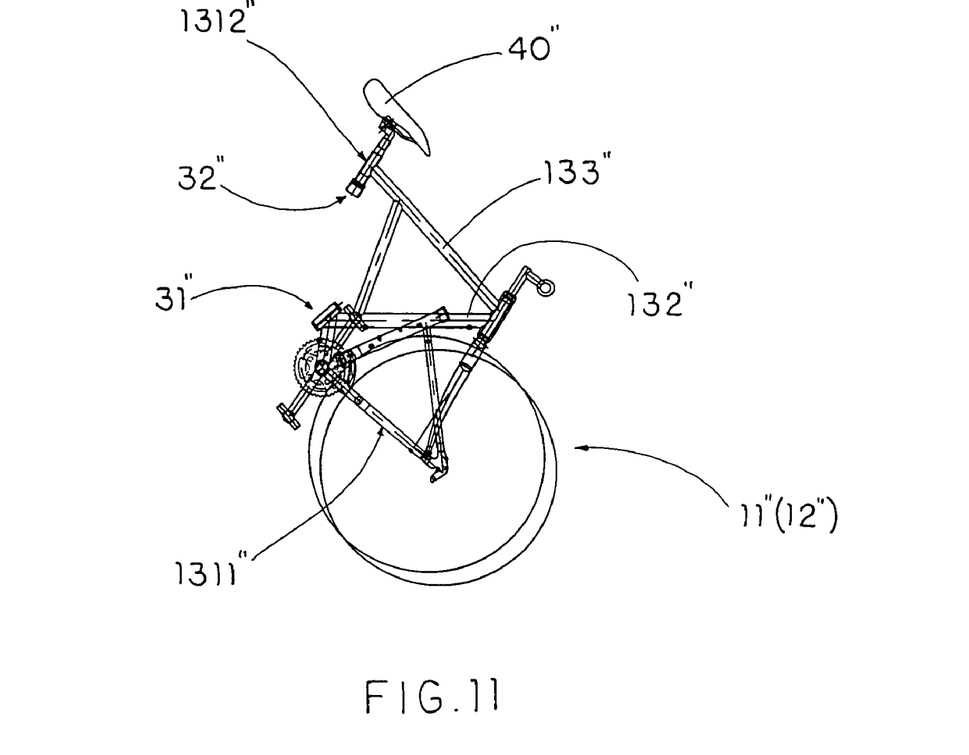
FIG. 11 is a second alternative mode of the foldable bicycle according to the above first preferred embodiment of the present invention, illustrating that the foldable bicycle is being folded.

Referring to FIG. 10 and FIG. 11 of the drawings, a second alternative mode of the foldable bicycle according to the above first preferred embodiment of the present invention is illustrated. The second alternative mode is similar to the first preferred embodiment except the position of the folding joint 31" and the detachable connecting joint 32".

According to the second alternative mode, the third of the supporting members 133" is longitudinally extended between the front portion 11" and the rear portion 12", the second of the supporting members 132" is inclinedly and rearwardly extended from the third supporting member 133" at the front portion 11", while the first of the supporting members 131" is transversely extended to connect the first and the second supporting members 132", 133" at the rear portion 12" to define the triangular structure of the body frame 10", wherein a upper top portion of the first supporting member 131" is transversely and upwardly extended to support a body seat 40" thereon.

Figure 12:
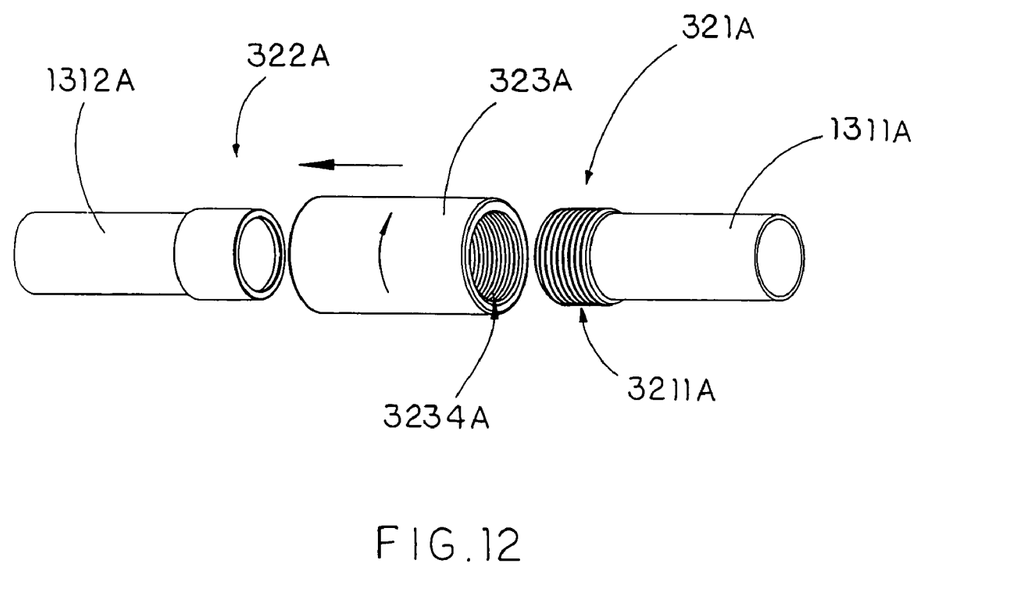
FIG. 12 is a perspective view of a detachable joint connector according to a second preferred embodiment of the present invention.
Figure 13:
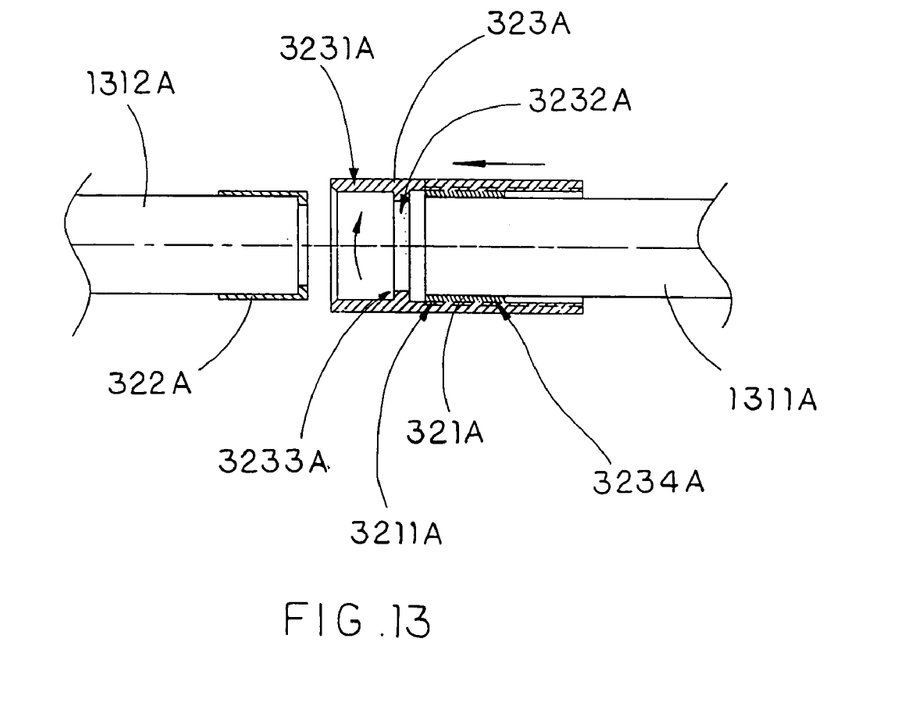
FIG. 13 is a sectional side view of the detachable connecting joint according to the above second preferred embodiment of the present invention, illustrating that the two engaging portions of the relevant supporting member are detached for folding.
Figure 14:
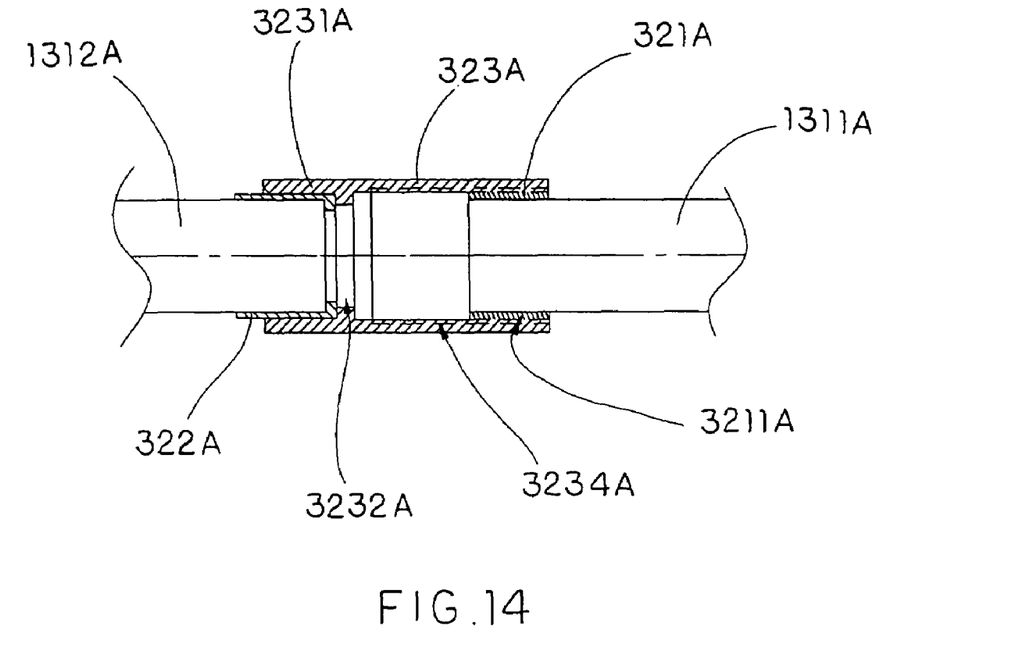
FIG. 14 is a sectional side view of the detachable connecting joint according to the above second preferred embodiment of the present invention, illustrating that the two engaging portions of the relevant supporting member are engaged.

FIG. 12 to FIG. 14 of the drawings illustrate the detachable connecting joint 32A according to a second preferred embodiment of the present invention. The second preferred embodiment is similar to the first preferred embodiment and its alternatives except the detachable connecting joint 32A.

According to the second preferred embodiment, the detachable connecting joint 32A comprises a first and a second tubular detachable connector 321A, 322A each having a tubular hole defined by a sidewall of the respective detachable connector 321A, 322A, wherein the two engaging portions 1311A, 1312A of the first supporting member 131A are connected with the first and the second tubular detachable connector 321A, 322A respectively within the respective tubular hole. Referring to FIG. 12 of the drawings, the first detachable connector 321A has a thread portion 3211A formed on an outer rim thereof.

Moreover, the detachable connecting joint 32A further comprises a securing member 323A detachably connecting between the first and the second detachable connectors 321A, 322A for being fittedly sandwiched between the first and the second connector 321A, 322A so as to prevent unwanted lateral movement between the first and the second connector 321A, 322A when the first detachable connector 321A is detachably connected with the second detachable connector 322A.

The securing member 323A has a bored portion 3234A having a diameter corresponding with the thread portion 3211A of the first detachable connector 321A, an enlarged securing portion 3231A having a diameter corresponding with a diameter of the second detachable connector 322A, and a restricted retention portion 3232A formed between the enlarged securing potion 3231A and the thread portion 3211A, wherein a diameter of the restricted retention portion 3232A is smaller than the diameter of the enlarged securing portion 3231A to define a biasing shoulder 3233A at the boundary between the enlarged securing portion 323 1A and the restricted retention portion 3232A.

In order to detachably attach the first and the second engaging portions 1311A, 1312A of the first supporting member 131A, the thread portion 3211A of the first detachable connector 321A is screwed and engaged with the bored portion 3234A of the securing member 323A while the second detachable connector 322A is sildably inserted at the enlarged securing portion 3231A to bias against the biasing shoulder 3233A such that any lateral movements between the first and second detachable connector 321A, 322A and the securing member 323A are substantially restricted, as shown in FIG. 13 of the drawings.

Figure 15:
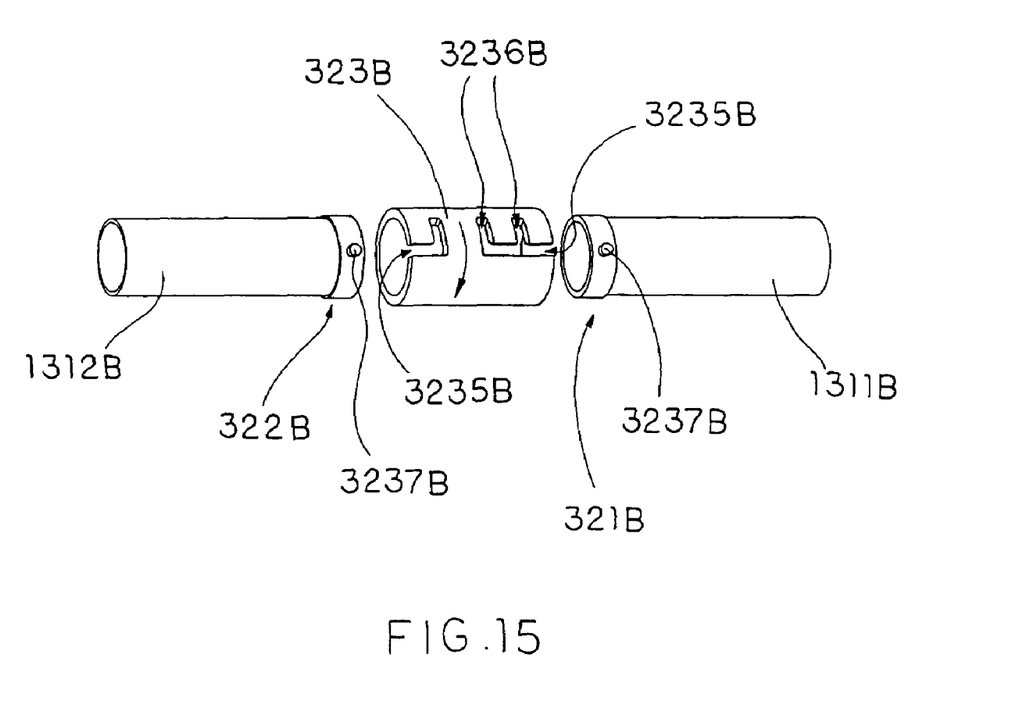
FIG. 15 is a perspective view of a detachable joint connector according to a third preferred embodiment of the present invention.
Figure 16:
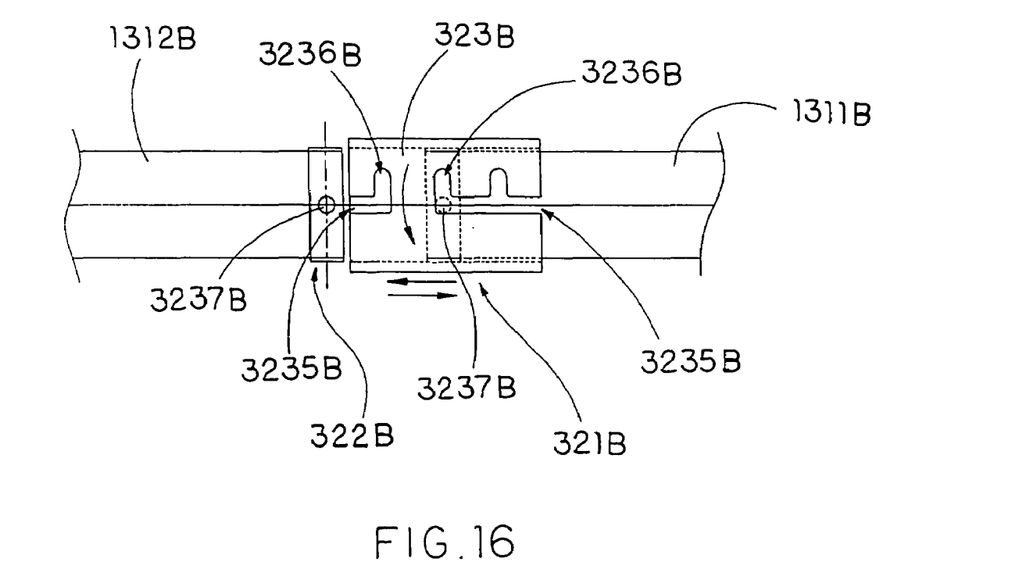
FIG. 16 is a sectional side view of the detachable connecting joint according to the above third preferred embodiment of the present invention, illustrating that the two engaging portions of the relevant supporting member are detached for folding.
Figure 17:
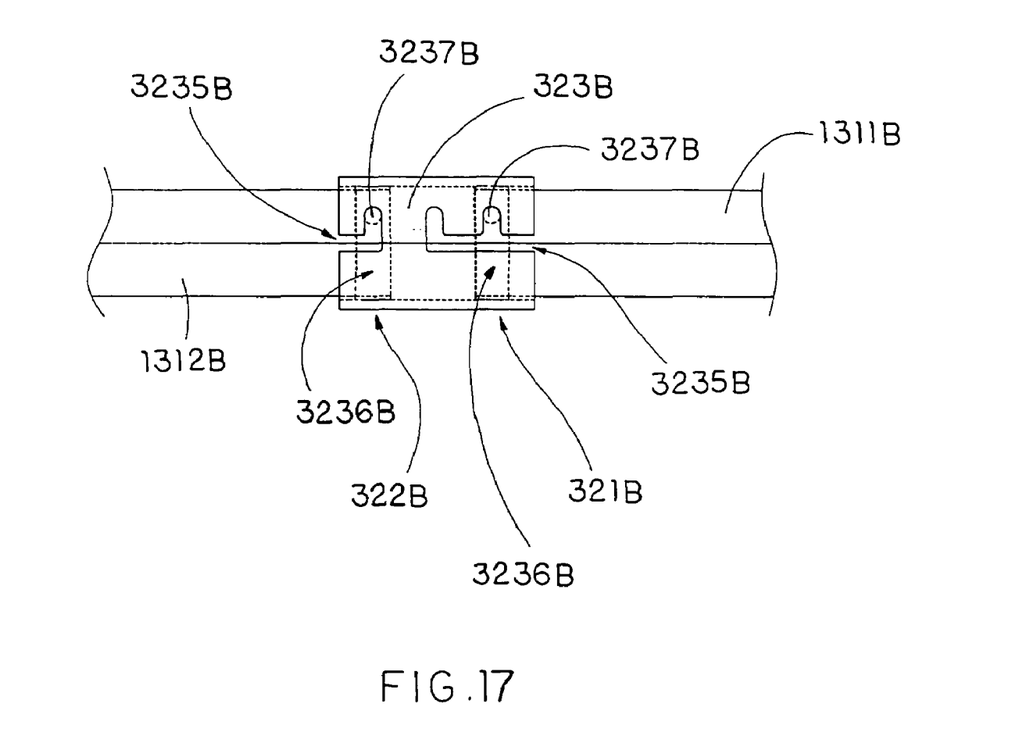
FIG. 17 is a sectional side view of the detachable connecting joint according to the above third preferred embodiment of the present invention, illustrating that the two engaging portions of the relevant supporting member are engaged.

FIG. 15 to FIG. 17 of the drawings illustrate the detachable connecting joint 32B according to a third preferred embodiment of the present invention. The third preferred embodiment is similar to the first preferred embodiment and its alternatives except the detachable connecting joint 32B.

According to the third preferred embodiment, the detachable connecting joint 32B comprises a first and a second tubular detachable connector 321B, 322B each having a tubular hole defined by a sidewall of the respective detachable connector 321B, 322B, wherein the two engaging portions 1311B, 1312B of the first supporting member 131B are connected with the first and the second tubular detachable connector 321B, 322B respectively within the respective tubular hole.

Moreover, the detachable connecting joint 32B further comprises a securing member 323B detachably connecting between the first and the second detachable connectors 321B, 322B for being fittedly sandwiched between the first and the second connector 321B, 322B so as to prevent unwanted lateral movement between the first and the second connector 321B, 322B when the first detachable connector 321B is detachably connected with the second detachable connector 322B.

Specifically, the securing member 323B is also embodied as tubular in shape having a through tubular hole, two longitudinal slots 3235B longitudinally extended from two ends of the securing member 323B along a longitudinal direction on a sidewall thereof, and at least two transverse slots 3236B transversely extended from the two longitudinal slots 3235B along the sidewall of the securing member 323B. According to the third preferred embodiment, there are altogether three transverse slots 3236B formed on the securing member 323B, wherein one the transverse slots 3236B is transversely extended from an inner end of one of the longitudinal slot 3235B to define a L-shaped locking slot, and two of the transverse slots 3236B are transversely extended from another of the longitudinal slots 3535B in a spacedly apart manner to define a F-shaped locking slot opposite to the L-shaped locking slot.

Furthermore, the connecting joint 32B further comprises two locking pins 3237B radially protruded from the first and the second detachable connector 321B, 322B at the positions corresponding to the two longitudinal slots 3235B respectively, such that when the first and the second detachable connector 321B, 322B are adapted to be inserted into the two ends of the securing tubular holes of the securing members 323B while the two locking pins 3237B are slidably inserted into the longitudinal slots 3235B to align with the transverse slots 3236B respectively. The first and the second detachable connector 321B, 322B are adapted to rotate within the securing member 323B so as to guide the locking pins 3237B slidably inserting into the transverse slots 3236B respectively for locking up any longitudinal movement between the first detachable connector 321B, the second detachable connector 322B, and the securing member 323B. Therefore, the two engaging portions 1311B, 1312B of the first supporting member 131B are capable of detachably connecting with each other.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A foldable bicycle, comprising:
   a bicycle frame, having a front portion, a rear portion, and a body frame connecting said front portion with said rear portion, wherein said body frame having a triangular structure comprises three supporting members connecting with each other;

two driving wheels rotatably mounted to said front and rear portions of said bicycle frame; and a folding arrangement, which comprises:

a folding joint provided at one of said supporting members to pivotally connect said front portion of said bicycle frame with said rear portion thereof; and a detachable connecting joint provided at another said supporting member to form said respective supporting member into two detachable engaging portions so as to disengage said triangular structure of said body frame, such that when said two detachable engaging portions are detached from each other, said front portion of said bicycle frame is adapted to pivotally fold towards said rear portion thereof via said folding joint to overlap said two driving wheels so as to fold up said foldable bicycle with a compact structure, wherein said folding joint comprises a pivot pin, a joint body having a pivotal cavity defined by a top cover and two side mounting walls of said joint body, and a fold guider pivotally mounted on said two side mounting walls within said pivotal cavity via said pivot pin, such that said fold guider is capable of pivotally folding to flip out of said pivotal cavity, wherein a supporting member pivotally connecting with said folding joint has a first portion and a second portion connecting with said fold guider and said joint body respectively so that said first portion and said second portion of said supporting member are capable of folding towards each other for folding said front portion towards said rear portion of said bicycle frame to form said compact structure, wherein said fold guider has a connecting base, a tubular axial holder, having a through axial slot, formed on a first side edge portion of said connecting base, and a lock holder formed on a second side edge portion of said connecting base, wherein said pivot pin is slidably inserted into said axial slot of said tubular axial holder for pivotally connecting said fold guider with said joint body at said two side mounting walls thereof.

2. A foldable bicycle, comprising:

a bicycle frame, having a front portion, a rear portion, and a body frame connecting said front portion with said rear portion, wherein said body frame having a triangular structure comprises three supporting members connecting with each other;

two driving wheels rotatably mounted to said front and rear portions of said bicycle frame; and a folding arrangement, which comprises:

a folding joint provided at one of said supporting members to pivotally connect said front portion of said bicycle frame with said rear portion thereof; and a detachable connecting joint provided at another said supporting member to form said respective supporting member into two detachable engaging portions so as to disengage said triangular structure of said body frame, such that when said two detachable engaging portions are detached from each other, said front portion of said bicycle frame is adapted to pivotally fold towards said rear portion thereof via said folding joint to overlap said two driving wheels so as to fold up said foldable bicycle with a compact structure, wherein said detachable connecting joint comprises a first and a second tubular detachable connector each having a tubular hole defined by a sidewall of said respective detachable connector, and a securing member sandwiched between said first and said second detachable connector for detachably connecting said first and said second detachable connector, wherein said two engaging portions of said respective supporting member are connected with said first and said second tubular detachable connector respectively within said respective tubular hole for detachably connecting said two engaging portions of said respective supporting member, wherein said securing member, which is tubular in shape having a through tubular hole, has two longitudinal slots longitudinally extended from two ends of said securing member along a longitudinal direction, and at least two transverse slots transversely extended from said two longitudinal slots respectively to define two L-shaped locking slots at two end portions of said securing member, wherein said connecting joint further comprises two locking pins radially protruded from said first and said second detachable connector at positions corresponding to said two longitudinal slots respectively, such that when said first and said second detachable connector are adapted to be inserted into said two ends of said securing member while said the two locking pins are slidably inserted into said longitudinal slots to align with said transverse slots respectively, said first and said second detachable connector are adapted to rotate within said securing member so as to guide said locking pins slidably inserting into said transverse slots respectively for locking up said first detachable connector, said second detachable connector, and said securing member.

3. A foldable bicycle, comprising:

a bicycle frame, having a front portion, a rear portion, and a body frame connecting said front portion with said rear portion, wherein said body frame having a triangular structure comprises three supporting members connecting with each other;

two driving wheels rotatably mounted to said front and rear portions of said bicycle frame; and a folding arrangement, which comprises:

a folding joint provided at one of said supporting members to pivotally connect said front portion of said bicycle frame with said rear portion thereof; and a detachable connecting joint provided at another said supporting member to form said respective supporting member into two detachable engaging portions so as to disengage said triangular structure of said body frame, such that when said two detachable engaging portions are detached from each other, said front portion of said bicycle frame is adapted to pivotally fold towards said rear portion thereof via said folding joint to overlap said two driving wheels so as to fold up said foldable bicycle with a compact structure, wherein said folding joint comprises a pivot pin, a joint body having a pivotal cavity defined by a top cover and two side mounting walls of said joint body, and a fold guider pivotally mounted on said two side mounting walls within said pivotal cavity via said pivot pin, such that said fold guider is capable of pivotally folding to flip out of said pivotal cavity, wherein a supporting member pivotally connecting with said folding joint has a first portion and a second portion connecting with said fold guider and said joint body respectively so that said first portion and said second portion of said supporting member are capable of folding towards each other for folding said front portion towards said rear portion of said bicycle frame to form said compact structure, wherein said fold guider has a connecting base, a tubular axial holder, having a through axial slot, formed on a first side edge portion of said connecting base, and a lock holder formed on a second side edge portion of said connecting base, wherein said pivot pin is slidably inserted into said axial slot of said tubular axial holder for pivotally connecting said fold guider with said joint body at said two side mounting walls thereof, wherein said folding joint further comprises a folding lock provided on said joint body and adapted to block said pivotal movement of said fold guider with respect to said joint body so as to lock up a folding motion of said bicycle frame, wherein said folding lock comprises a lock platform formed on said top cover of said joint body, a longitudinal lock member connecting with said lock holder of said fold guider, and a transverse lock member mounted on said lock platform and adapted to move between a locked position and an unlocked position, wherein at said locked position, said transverse lock member is extended to couple with said longitudinal lock member and interlock with said lock platform for blocking a pivotal movement of said fold guider, wherein at said unlock position, said transverse lock member is lifted to disengage with said longitudinal lock member so as to allow pivotal movement of said fold guider for allowing folding of said bicycle frame, wherein said detachable connecting joint comprises a first and a second tubular detachable connector each having a tubular hole defined by a sidewall of said respective detachable connector, and a securing member sandwiched between said first and said second detachable connector for detachably connecting said first and said second detachable connector, wherein said two engaging portions of said respective supporting member are connected with said first and said second tubular detachable connector respectively within said respective tubular hole for detachably connecting said two engaging portions of said respective supporting member, wherein said securing member, which is tubular in shape having a through tubular hole, has two longitudinal slots longitudinally extended from two ends of said securing member along a longitudinal direction, and at least two transverse slots transversely extended from said two longitudinal slots respectively to define two L-shaped locking slots at two end portions of said securing member, wherein said connecting joint further comprises two locking pins radially protruded from said first and said second detachable connector at positions corresponding to said two longitudinal slots respectively, such that when said first and said second detachable connector are adapted to be inserted into said two ends of said securing member while said the two locking pins are slidably inserted into said longitudinal slots to align with said transverse slots respectively, said first and said second detachable connector are adapted to rotate within said securing member so as to guide said locking pins slidably inserting into said transverse slots respectively for locking up said first detachable connector, said second detachable connector, and said securing member.

4. The foldable bicycle, as recited in claim 3, wherein a first of said supporting member supporting said connecting joint is longitudinally extended between said front portion and said rear portion, a second of said supporting members supporting said folding joint is inclinedly and rearwardly extended from said first supporting member at said front portion, and a third of said supporting members is transversely extended to connect said first and said second supporting members at said rear portion to define said foldable triangular structure of said body frame.

5. The foldable bicycle, as recited in claim 3, wherein a second of said supporting member supporting said connecting joint is longitudinally extended between said front portion and said rear portion, a first of said supporting members supporting said folding joint is inclinedly and rearwardly extended from said second supporting member at said front portion, and a third of said supporting members is transversely extended to connect said first and said second supporting members at said rear portion to define said foldable triangular structure of said body frame.

6. The foldable bicycle, as recited in claim 3, wherein a third of said supporting member supporting said connecting joint is longitudinally extended between said front portion and said rear portion, a second of said supporting members supporting said folding joint is inclinedly and rearwardly extended from said third supporting member at said front portion, and a first of said supporting members is transversely extended to connect said first and said second supporting members at said rear portion to define said foldable triangular structure of said body frame.

* * * * *